United States Patent [19]
Arai et al.

[11] Patent Number: 5,435,042
[45] Date of Patent: Jul. 25, 1995

[54] WINDSHIELD WIPER ARM INCLUDING A LINK DEVICE

[75] Inventors: Masaru Arai; Itsuro Saita, both of Kazu, Japan

[73] Assignee: Nippon Wiperblade Co., Ltd., Kazo, Japan

[21] Appl. No.: 185,511

[22] Filed: Jan. 24, 1994

[30] Foreign Application Priority Data

Jan. 25, 1993 [JP] Japan .................... 5-008609 U

[51] Int. Cl.$^6$ ................................ B60S 1/32
[52] U.S. Cl. ................................... 15/250.35
[58] Field of Search ........... 15/250.35, 250.20, 250.21, 15/250.23, 250.31, 250.34

[56] References Cited

U.S. PATENT DOCUMENTS 2,844,838  7/1958  Krohm ..................... 15/250.35
4,477,940  10/1984  Will ......................... 15/250.35

FOREIGN PATENT DOCUMENTS 2516879  5/1983  France ..................... 15/250.35
3643733  6/1988  Germany .................. 15/250.20

*Primary Examiner*—Gary K. Graham
*Attorney, Agent, or Firm*—Wenderoth, Lind & Ponack

[57] ABSTRACT

A windshield wiper includes a mounting head and a retainer pivotally supported on the arm-mounting head adapted to support a wiperblade. There is provided a linkage having one end pivotally supported on either of the mounting head or the retainer, a spring is disposed between the linkage and either of the retainer or the mounting head. On the other of the retainer or the mounting head, there is provided a device for restricting range of the movement of the linkage.

14 Claims, 4 Drawing Sheets

5,435,042

WINDSHIELD WIPER ARM INCLUDING A LINK DEVICE

FIELD OF THE INVENTION

The present invention relates to a windshield wiper for use in a vehicle such as an automobile and, particularly to a construction for connecting a mounting head with a retainer which is pivotally supported on the mounting head and supporting a wiperblade of the windshield wiper.

DESCRIPTION OF PRIOR ART

In a conventional windshield wiper, a tension or compression spring is disposed between an arm-head (or mounting head) and a retainer which is pivotally supported on the arm-head and supports a wiperblade, such that the spring force of the spring acts to urge the wiperblade against the surface of the windshield.

In such prior art windshield wiper, most of the spring force acts on a hinge pin between the arm-head and the retainer. This increases the bearing pressure of the hinge pin thereby inducing abrasion of the hinge pin and the bearing, and leading to rattling. Further, in cleaning the surface of the windshield it is usually necessary to set the wiperblade in a so-called rock-back condition whereby the the wiperblade is moved upward and away from the surface of the windshield, and it is desirable for the angle of the rock-back condition to not be large and for the rock-back condition to be stable and reliable.

An object of the present invention is to provide a windshield wiper for satisfying the above described requirements.

SUMMARY OF THE INVENTION

According to the invention, there is provided a windshield wiper of the type including an arm-head (or mounting head) and a retainer which is pivotally supported on the arm-head and supports a wiperblade. A linkage or link device is provided and has one end pivotally supported on either of the arm-head or the retainer. A spring is mounted between the linkage and either of the retainer or the arm-head, and means for restricting the range of the movement of the linkage is provided on the other of the retainer and the arm-head.

The linkage may be pivotally supported on the retainer at one end, with the spring acting between the other end of the linkage and the retainer, and the means for restricting the range of the movement of the linkage may be provided on the arm-head.

The linkage may be pivotally supported on the retainer at one end, with the spring acting between the other end of the linkage and the arm-head, and the means for restricting the range of the movement of the linkage may be provided on the arm-head.

The linkage may be pivotally supported on the arm-head at one end, with the spring acting between the other end of the linkage and the retainer, and the means for restricting the range of the movement of the linkage may be provided on the arm-head.

The linkage may be pivotally supported on the arm-head at one end, with the spring acting between the other end of the linkage and the retainer, and the means for restricting the range of the movement of the linkage may be provided on the retainer.

The linkage may be a two-arm linkage. A device restricting the range of the movement of the linkage may include a wall abutting with an intermediate hinge portion of the linkage to restrict the movement of the intermediate hinge portion of the linkage around a pivotal supporting portion, and a device for restricting the movement of the other end of the linkage to reciprocating in one direction.

One end of the two-arm linkage may be pivotally supported on the retainer, with the wall being provided on the arm-head, while the spring is formed of a tension spring.

One end of the two-arm linkage may be pivotally supported on the retainer, with the wall being provided on the arm-head, while the spring is formed of a compression spring.

The linkage may be formed of a one-arm linkage, with one end of the linkage being pivotally supported on the retainer and the other end of the linkage being received in an opening of the retainer and being movable in vertical directions, while a tension spring acts between the other end of the linkage and the retainer.

According to the invention, it is possible to reduce the force acting on a hinge pin which pivotally supports on the arm-head the retainer supporting the wiperblade, to improve the durability of the hinge portion and to prevent rattling. Further, it is possible to reduce the size of the hinge portion.

According to the invention, the height of the wiper device can be reduced as compared with prior art hook type wiper devices, and it is possible to reduce the angle of the rock-back condition.

BRIEF DESCRIPTION OF THE DRAWINGS

Further objects and effects of the present invention will become apparent from the following detailed description in conjunction with the drawings, in which.

DETAILED DESCRIPTION OF PREFERRED EMBODIMENTS

Figure 1:
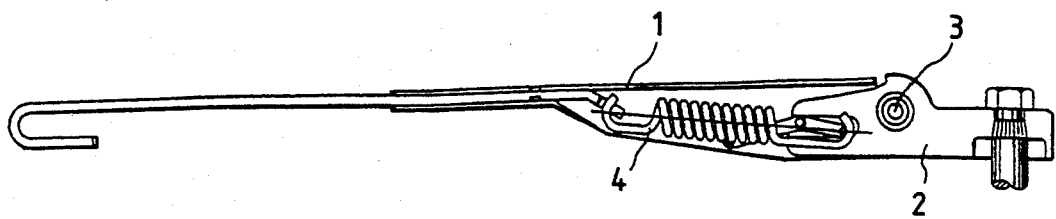
FIG. 1 is a schematic view of a wiper arm of a wiper device according to a first embodiment of the present invention and in a normal operating condition.
Figure 2:
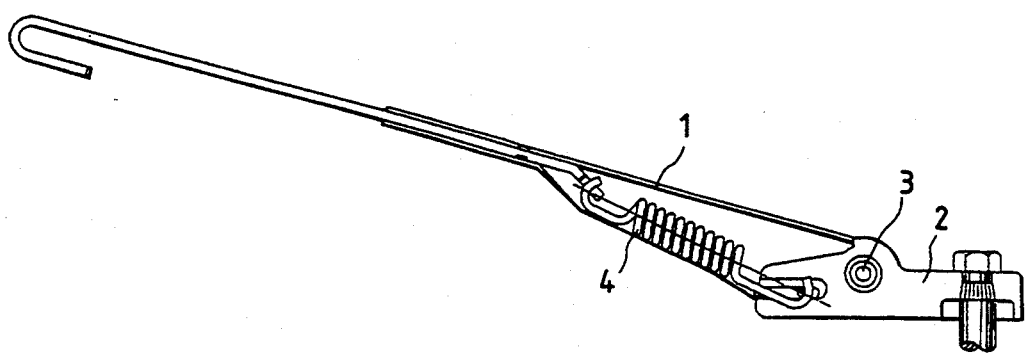
FIG. 2 is a schematic view of the wiper arm of FIG. 1 in a rock-back condition.
Figure 3:
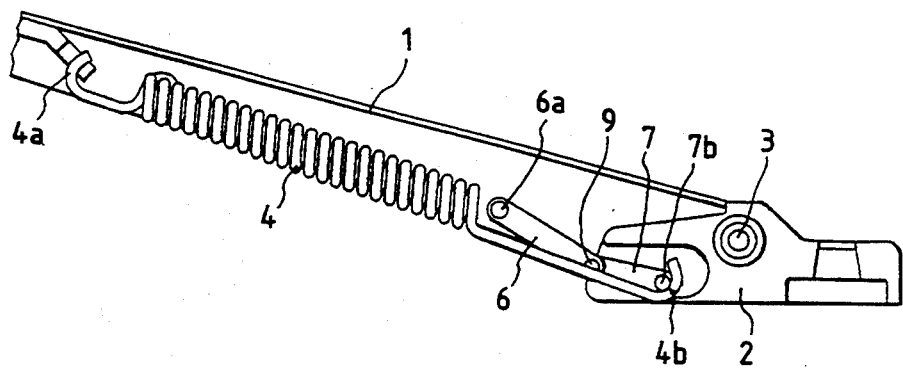
FIG. 3 is a detailed view of the wiper arm of FIG. 2.
Figure 4:
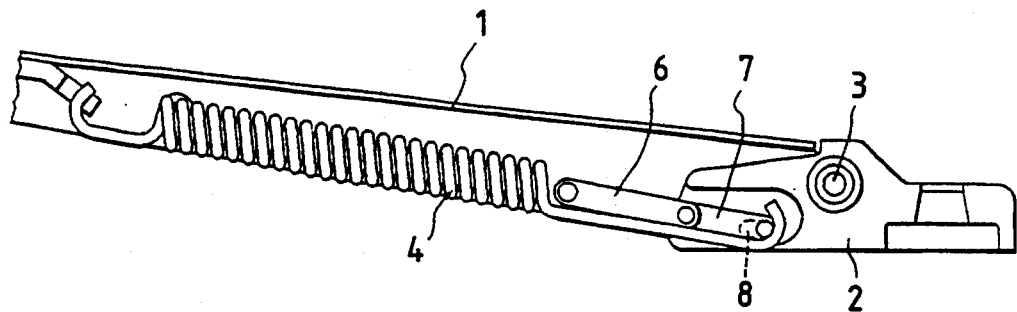
FIG. 4 is a detailed view of the wiper arm of FIG. 1, but in and a neutral condition.
Figure 5:
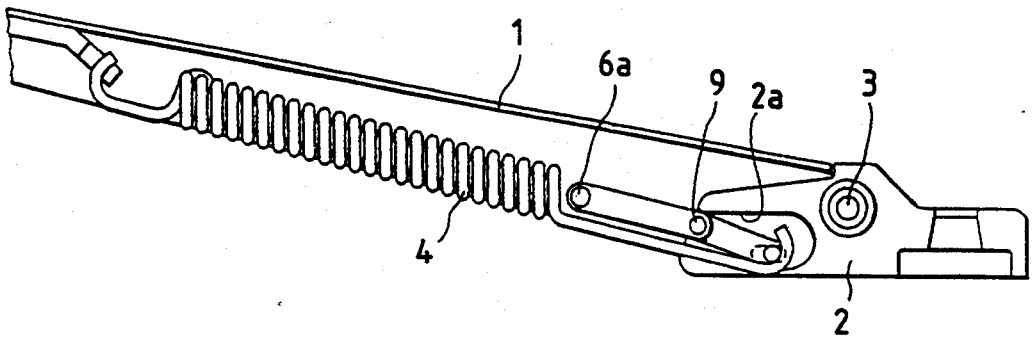
FIG. 5 is a detailed view of the wiper arm of FIG. 1 and, but in another neutral condition.
Figure 6:
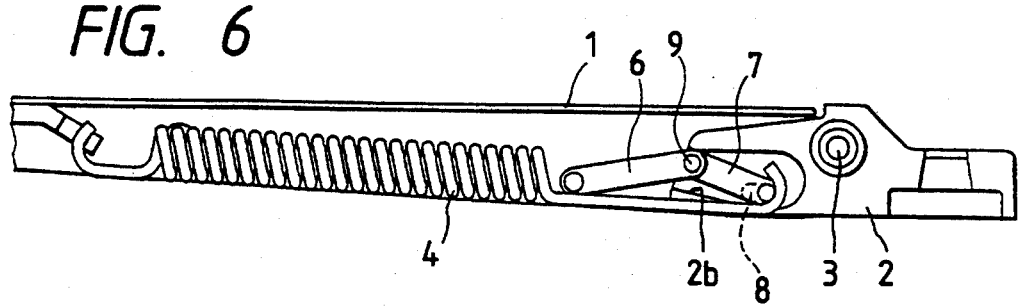
FIG. 6 is a detailed explanatory view of FIG. 1.
Figure 7:
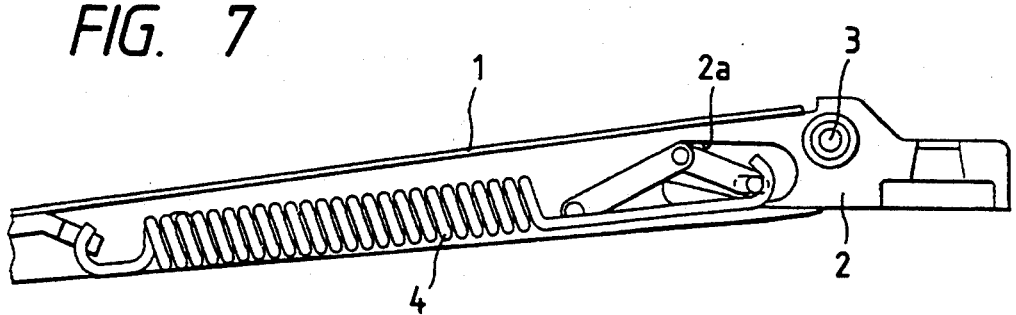
FIG. 7 is a detailed explanatory view of the wiper arm of FIG. 1 and, but in free load condition.

FIG. 1 through FIG. 7 show a first embodiment of the present invention, in which FIG. 1 shows a normal loading condition, FIG. 2 a rock-back condition, FIG. 3 a detailed view of the rock-back condition of FIG. 2, FIG. 4 and FIG. 5 a second and a first dead-point or neutral conditions, respectively, FIG. 6 a detailed view of the normal loading condition of FIG. 1, and FIG. 7 a detailed view of a free condition. In respective drawings, shown at numeral 1 is a retainer, at 2 is an arm-head (or mounting head), at 3 a hinge pin pivotally connecting the retainer 1 with the arm-head 2, and at 4 is a tension spring.

The tension spring 4 includes one end 4a connected to the retainer 1 and the other end 4b connected to one end 7b of a two-arm linkage (6 and 7). The other end 6a of the linkage is pivotally supported on the retainer 1, and the end 7b of the linkage is slidingly supported in a groove or elongated opening 8 formed in the retainer 1. The arms 6 and 7 of the linkage are pivotally connected at an intermediate hinge portion 9. The rotational axes of these pivotal portions 6a, 9 and 7b are respectively parallel, and are parallel to the axis of the hinge pin 3. The movement of the intermediate hinge portion 9 is restricted by upper and lower walls 2a and 2b (FIGS. 6 and 7) of an opening formed in the arm-head 2, whereby the movement of the end portion 7b of the linkage (6 and 7) in the opening 8 is restricted.

FIG. 3 shows a rock-back condition, at which the intermediate hinge portion 9 of the linkage abuts with the lower wall 2b of the arm-head 2, such that the linkage (6 and 7) attains a stable condition. FIGS. 4 and 5 show two dead point conditions or neutral conditions between the rock-back condition of FIG. 3 and the normal operating condition of FIG. 6. The intermediate hinge portion 9 abuts with the upper wall 2a in the condition of FIG. 5, and with the lower wall 2b in the condition of FIG. 4. FIG. 6 shows the normal operating condition, in which the intermediate hinge portion 9 abuts with the upper wall 2a of the arm-head 2. FIG. 7 shows the free condition, in which the overall length of the tension spring 4 is at a minimum which is defined by the linkage (6 and 7).

According to the invention, the force of the spring 4 acting on the hinge pin 3 can be reduced to a minimum, thus, it is possible to reduce the wear of the hinge pin 3 and to reduce the rattling or excess play of the hinge pin 3.

Figure 8:
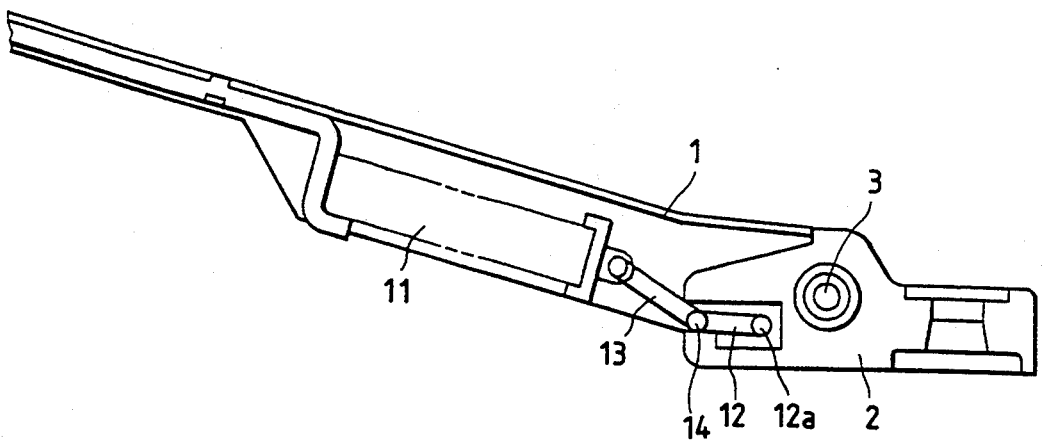
FIG. 8 is a schematic view of a wiper arm according to a second embodiment of the invention and in the rock-back condition.
Figure 9:
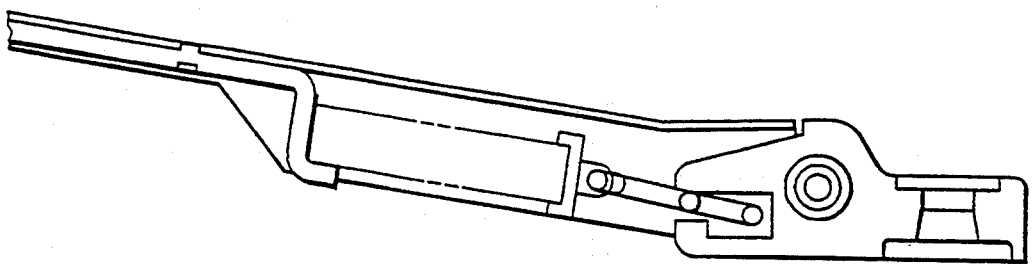
FIG. 9 is a detailed explanatory view of the wiper arm of FIG. 8, but in and at the neutral condition.
Figure 10:
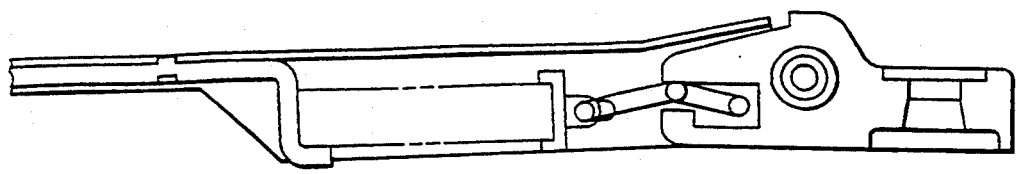
FIG. 10 is a schematic view of the wiper arm of FIG. 8, but in the normal load condition.

FIG. 8 through FIG. 10 show a second embodiment of the invention, in which a compression spring 11 is utilized in place of the tension spring 4, and a two-arm linkage (12 and 13) replaces the linkage (6 and 7) of the first embodiment. The movement of an intermediate hinge portion 14 of the linkage (12 and 13) in the upward and downward directions is, like the first embodiment, restricted by the upper and lower walls of an opening in the arm-head 2. An end portion 12a of the link is pivotally supported on the retainer 1. Incidentally, FIG. 8 shows a rock-back condition, FIG. 9 an intermediate or neutral condition, and FIG. 10 shows the normal operating condition. The embodiment is generally similar to the first embodiment, and thus, further detailed description is omitted.

Figure 11:
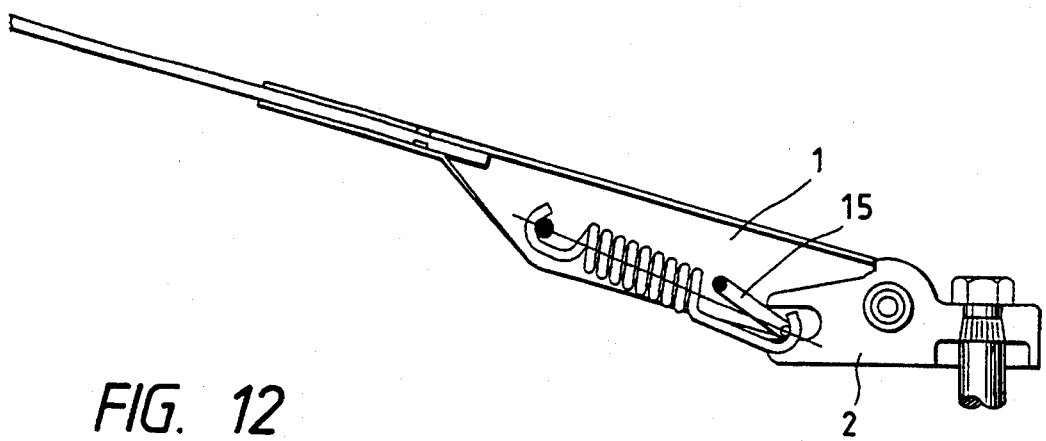
FIG. 11 is a schematic view of a wiper arm according to a third embodiment of the invention and in the rock-back condition.
Figure 12:
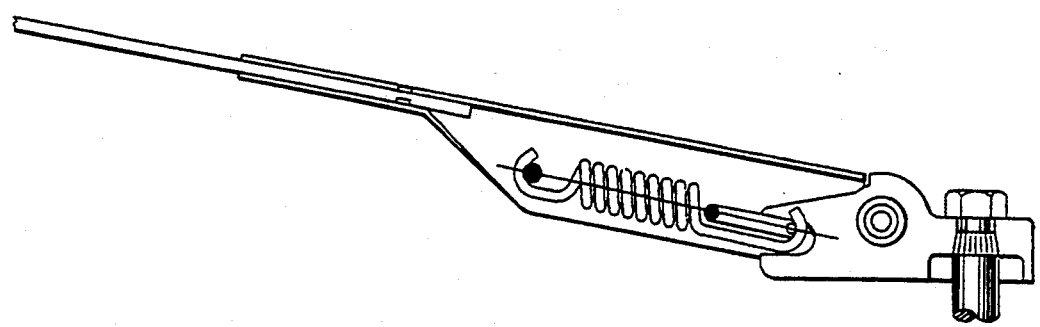
FIG. 12 is a schematic view of the wiper arm of FIG. 11, but in the neutral condition.
Figure 13:
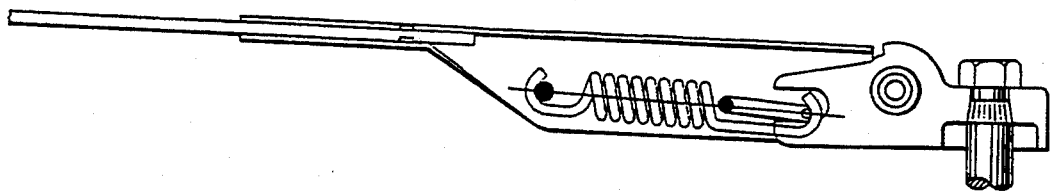
FIG. 13 is a schematic view of the wiper arm of FIG. 11, but in another neutral condition.
Figure 14:
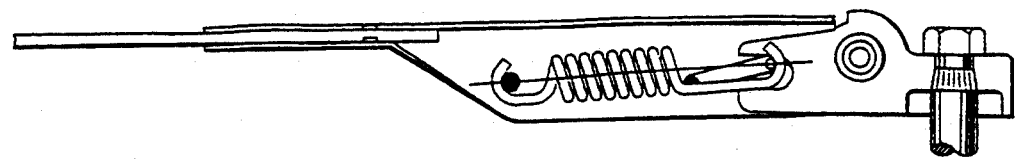
FIG. 14 is a schematic view of the wiper arm of FIG. 11, but in the normal load condition.

FIG. 11 through FIG. 14 show a third embodiment of the present invention in which, a one-arm linkage (i.e., a link) 15 is provided. One end of the linkage 15 is pivotally supported on the retainer 1, and the other end of the linkage 15 is movable upward and downward in an opening in the arm-head 2. FIG. 11 shows a rock-back condition, FIGS. 12 and 13 show respectively neutral conditions, and FIG. 14 shows the normal operating condition. The operation of the embodiment is generally similar the preceding embodiments and, thus, further detailed description is omitted.

According to the invention, it is possible to reduce the force acting on the hinge pin pivotally connecting the retainer with the arm-head, and thus, it is possible to improve the durability of the hinge portion, so as to prevent excess wear of the hinge portion, and to reduce the size of the hinge portion. Further, it is possible to reduce the height of the wiper arm, and to attain a rock-back condition of a small angle.

The invention is not limited to the embodiments, and various changes and modifications can easily be made by those skilled in the art. For example, the groove 8 slidingly receive the end portion 7b may define a straight passage or a curved passage.

What is claimed is:

1. A windshield wiper arm comprising:
   a mounting head, said mounting head comprising spaced abutment surfaces with an opening therebetween;
   an elongated wiperblade retainer pivotally supported on said mounting head, said retainer having a base end and a tip end;
   a link device comprising at least one link, said link device having a first end and a second end, said first end of said link device being pivotally connected to said retainer;
   an elongated spring having a first end connected to said retainer and a second end connected to said second end of said link device, said first end of said spring being located closer than said second end of said link device to said tip end of said retainer, and said first end of said link device being located between said first end of said spring and said second end of said link device; and
   said opening receives at least a portion of said link device therein such that said link device is adapted to engage with said surfaces upon pivotal movement of said retainer relative to said mounting head.

2. A windshield wiper arm as recited in claim 1, wherein
   said link device comprises a two-arm linkage having a first pivot portion at said first end of said link device, a second pivot portion at said second end of said link device and an intermediate hinge portion between said first and second pivot portions; and
   said spaced abutment surfaces comprise walls for abutting with said intermediate hinge portion of said two-arm linkage to restrict pivotal movement of said link device about said first pivot portion.

3. A windshield wiper arm as recited in claim 2, wherein
   said second end of said link device includes a pin;
   an elongated opening is formed in said retainer; and
   said pin is slidably mounted in said elongated opening.

4. A windshield wiper arm as recited in claim 3, wherein
   said elongated opening extends along a straight line.

5. A windshield wiper arm as recited in claim 1, wherein said spring comprises a tension spring.

6. A windshield wiper arm as recited in claim 1, wherein
said link device comprises a one-arm linkage; and
said spring comprises a tension spring.

7. A windshield wiper arm as recited in claim 1, wherein
said abutment surface constitute restricting means for restricting pivotal movement of said link device.

8. A windshield wiper arm comprising:
a mounting head, said mounting head comprising spaced abutment surfaces with an opening therebetween;
an elongated wiperblade retainer having a base end and a tip end, said retainer being pivotally mounted at said base end thereof to said mounting head;
a link device comprising at least one link, said link device having a first end and a second end, said first end of said link device being pivotally connected to said retainer;
an elongated spring having a first end connected to said retainer and a second end connected to said second end of said link device, said first end of said spring being located closer than said second end of said spring to said tip end of said retainer, and said first end of said link device being located closer than said second end of said link device to said tip end of said retainer; and
said opening receives at least a portion of said link device therein such that said link device is adapted to engage with said surfaces upon pivotal movement of said retainer relative to said mounting head.

9. A windshield wiper arm as recited in claim 8, wherein
said link device comprises a two-arm linkage having a first pivot portion at said first end of said link device, a second pivot portion at said second end of said link device and an intermediate hinge portion between said first and second pivot portions; and
said spaced abutment surfaces comprise walls for abutting with said intermediate hinge portion of said two-arm linkage to restrict pivotal movement of said link device about said first pivot portion.

10. A windshield wiper arm as recited in claim 9, wherein
said second end of said link device includes a pin;
an elongated opening is formed in said retainer; and
said pin is slidably mounted in said elongated opening.

11. A windshield wiper arm as recited in claim 10, wherein
said elongated opening extends along a straight line.

12. A windshield wiper arm as recited in claim 8, wherein
said spring comprises a tension spring.

13. A windshield wiper arm as recited in claim 8, wherein
said link device comprises a one-arm linkage; and
said spring comprises a tension spring.

14. A windshield wiper arm as recited in claim 8, wherein
said abutment surfaces constitute restricting means for restricting pivotal movement of said link device.

* * * * *